United States Patent
Gardner et al.

[19]

[11] Patent Number: 5,900,829
[45] Date of Patent: May 4, 1999

[54] METHOD OF AND APPARATUS FOR DETECTING KEY ACTUATIONS

[75] Inventors: Michael Robert Gardner, Mount Prospect; Robert Michael Johnson, Jr., Lake Zurich; Mark John Lachiw, Wauconda, all of Ill.

[73] Assignee: Motorola, Inc., Schaumburg, Ill.

[21] Appl. No.: 08/685,122

[22] Filed: Jul. 23, 1996

[51] Int. Cl.$^6$ .................................................. H03K 17/94
[52] U.S. Cl. .............................. 341/26; 341/22; 379/368; 345/168; 400/472; 455/347
[58] Field of Search ........................ 341/22, 26; 379/368, 379/369; 178/17 C; 455/90, 128, 347, 351; 364/709.12, 189; 400/472; 345/168

[56] References Cited

U.S. PATENT DOCUMENTS

| | | | |
|---|---|---|---|
| 3,551,616 | 12/1970 | Juliusburger et al. | |
| 3,643,254 | 2/1972 | Proebsting | |
| 4,064,399 | 12/1977 | Muranaka | |
| 4,532,497 | 7/1985 | Danish | |
| 5,023,936 | 6/1991 | Szczutkowski et al. | 455/90 |
| 5,057,836 | 10/1991 | Inaba | 341/26 |
| 5,070,330 | 12/1991 | Wu | |
| 5,265,274 | 11/1993 | Knutson et al. | 455/347 |
| 5,266,950 | 11/1993 | Gulick et al. | |
| 5,512,893 | 4/1996 | Gulick | |
| 5,534,860 | 7/1996 | Phillips et al. | 341/22 |

FOREIGN PATENT DOCUMENTS

| | | |
|---|---|---|
| 0030527 A2 | 6/1981 | European Pat. Off. ........ D05B 23/00 |
| 0188151 A1 | 7/1986 | European Pat. Off. ....... H03M 11/00 |
| 7123162 | 3/1972 | France .............................. G06F 3/00 |
| 2134600 | 2/1972 | Germany .......................... G06F 3/02 |
| 1337083 | 11/1973 | United Kingdom . |
| 1415469 | 11/1975 | United Kingdom . |
| 2047448 | 11/1980 | United Kingdom . |
| 2234378 | 1/1991 | United Kingdom . |
| 2283846 | 5/1995 | United Kingdom . |

*Primary Examiner*—Brian Zimmerman
*Assistant Examiner*—Timothy Edwards, Jr.
*Attorney, Agent, or Firm*—John J. Oskorep

[57] ABSTRACT

An electronic device (100) includes at least L keys (114) and a processor (506) having at least M inputs (600). Upon actuation, each one of the at least L keys (114) toggles a unique combination of N inputs of the at least M inputs (600), where each unique combination is taken from all possible combinations thereof. The at least M inputs (600) are read by the processor (506) and compared to a plurality of predetermined key patterns (806). Upon a match between the at least M inputs (600) and one of the plurality of predetermined key patterns (806), a key actuation is detected and a predetermined function may be processed in response thereto. The processor (506) may ignore simultaneous key actuations where combinations of inputs greater than N are toggled.

11 Claims, 6 Drawing Sheets

100

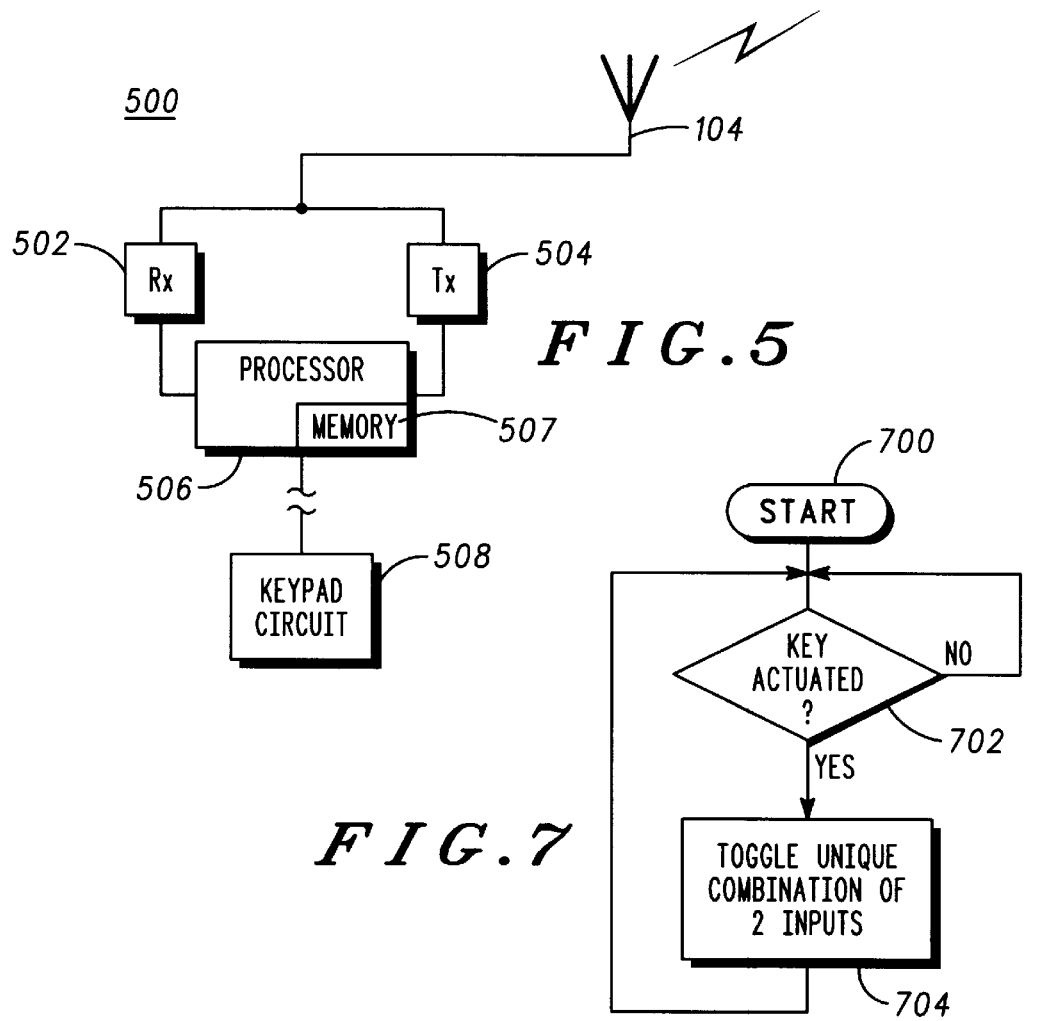
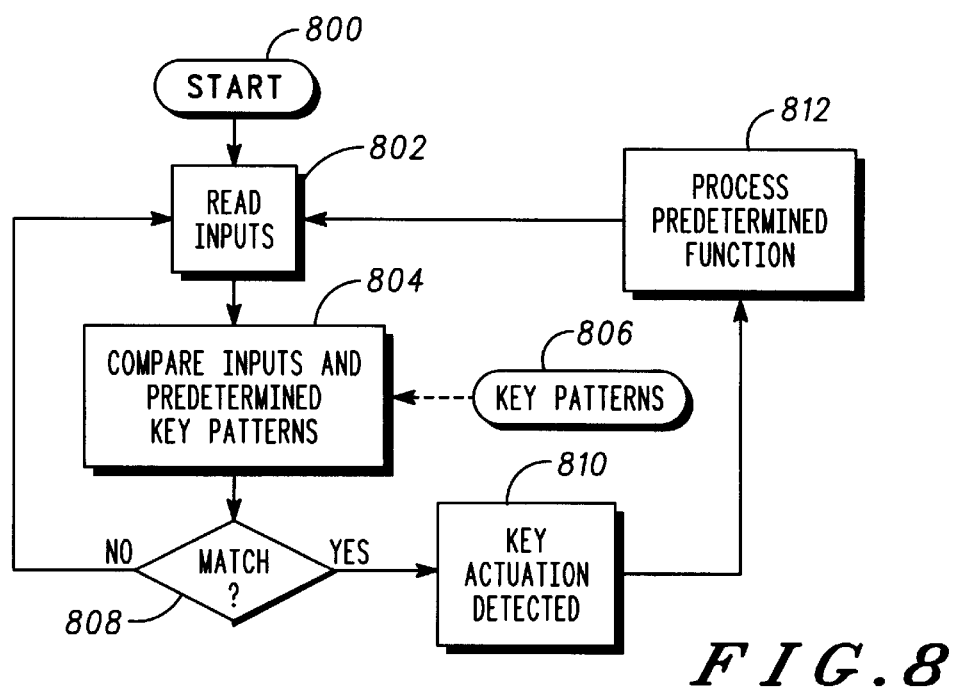

FIG. 9

| | INPUTS | | | | | | | KEY PRESSED |
|---|---|---|---|---|---|---|---|---|
| | I1 | I2 | I3 | I4 | I5 | I6 | I7 | |
| ① | 1 | 1 | 1 | 1 | 1 | 1 | 1 | NONE |
| ② | 0 | 0 | 1 | 1 | 1 | 1 | 1 | 1 |
| ③ | 0 | 1 | 0 | 1 | 1 | 1 | 1 | 2 |
| ④ | 0 | 1 | 1 | 0 | 1 | 1 | 1 | 3 |
| ⑤ | 0 | 1 | 1 | 1 | 0 | 1 | 1 | OK |
| ⑥ | 0 | 1 | 1 | 1 | 1 | 0 | 1 | 4 |
| ⑦ | 0 | 1 | 1 | 1 | 1 | 1 | 0 | 5 |
| ⑧ | 1 | 0 | 0 | 1 | 1 | 1 | 1 | 6 |
| ⑨ | 1 | 0 | 1 | 0 | 1 | 1 | 1 | C |
| ⑩ | 1 | 0 | 1 | 1 | 0 | 1 | 1 | 7 |
| ⑪ | 1 | 0 | 1 | 1 | 1 | 0 | 1 | 8 |
| ⑫ | 1 | 0 | 1 | 1 | 1 | 1 | 0 | 9 |
| ⑬ | 1 | 1 | 0 | 0 | 1 | 1 | 1 | ✉ |
| ⑭ | 1 | 1 | 0 | 1 | 0 | 1 | 1 | * |
| ⑮ | 1 | 1 | 0 | 1 | 1 | 0 | 1 | 0 |
| ⑯ | 1 | 1 | 0 | 1 | 1 | 1 | 0 | # |
| ⑰ | 1 | 1 | 1 | 0 | 0 | 1 | 1 | ▽ |
| ⑱ | 1 | 1 | 1 | 0 | 1 | 0 | 1 | MR |
| ⑲ | 1 | 1 | 1 | 0 | 1 | 1 | 0 | M+ |
| ⑳ | 1 | 1 | 1 | 1 | 0 | 0 | 1 | ▼ |
| ㉑ | 1 | 1 | 1 | 1 | 0 | 1 | 0 | ▲ |

| | INPUTS | | | | | KEY PRESSED |
|---|---|---|---|---|---|---|
| | I1 | I2 | I3 | I4 | I5 | |
| ① | 1 | 1 | 1 | 1 | 1 | NONE |
| ② | 0 | 0 | 1 | 1 | 1 | B |
| ③ | 0 | 1 | 0 | 1 | 1 | C |
| ④ | 0 | 1 | 1 | 0 | 1 | D |
| ⑤ | 0 | 1 | 1 | 1 | 0 | E |
| ⑥ | 1 | 0 | 0 | 1 | 1 | F |
| ⑦ | 1 | 0 | 1 | 0 | 1 | G |
| ⑧ | 1 | 0 | 1 | 1 | 0 | H |
| ⑨ | 1 | 1 | 0 | 0 | 1 | I |
| ⑩ | 1 | 1 | 0 | 1 | 0 | J |
| ⑪ | 1 | 1 | 1 | 0 | 0 | K |
| ⑫ | 0 | 0 | 0 | 1 | 1 | L |
| ⑬ | 0 | 0 | 1 | 0 | 1 | M |
| ⑭ | 0 | 0 | 1 | 1 | 0 | N |
| ⑮ | 0 | 1 | 1 | 1 | 1 | O |
| ⑯ | 1 | 0 | 1 | 1 | 1 | P |
| ⑰ | 1 | 1 | 0 | 1 | 1 | Q |

FIG. 11

| | INPUTS | | | | | | | KEY PRESSED |
|---|---|---|---|---|---|---|---|---|
| | I1 | I2 | I3 | I4 | I5 | I6 | I7 | |
| ① | 1 | 1 | 1 | 1 | 1 | 1 | 1 | NONE |
| ② | 0 | 0 | 0 | 1 | 1 | 1 | 1 | AA |
| ③ | 0 | 0 | 1 | 0 | 1 | 1 | 1 | BB |
| ④ | 0 | 0 | 1 | 1 | 0 | 1 | 1 | CC |
| ⑤ | 0 | 0 | 1 | 1 | 1 | 0 | 1 | DD |
| ⑥ | 0 | 0 | 1 | 1 | 1 | 1 | 0 | EE |
| ⑦ | 0 | 1 | 0 | 0 | 1 | 1 | 1 | FF |
| ⑧ | 0 | 1 | 0 | 1 | 0 | 1 | 1 | GG |
| ⑨ | 0 | 1 | 0 | 1 | 1 | 0 | 1 | HH |
| ⑩ | 0 | 1 | 0 | 1 | 1 | 1 | 0 | II |
| ⑪ | 0 | 1 | 1 | 0 | 0 | 1 | 1 | JJ |
| ⑫ | 0 | 1 | 1 | 0 | 1 | 0 | 1 | KK |

METHOD OF AND APPARATUS FOR DETECTING KEY ACTUATIONS

FIELD OF THE INVENTION

The present invention relates generally to the field of detecting key actuations, and more particularly to detecting key actuations from a keypad of a communication device.

BACKGROUND OF THE INVENTION

An electronic device typically includes a keypad having a plurality of keys used for operating the electronic device. A processor of the electronic device typically detects user actuations of these keys and processes them accordingly. Since the processor has only a limited amount of inputs which can be used for such tasks, the inputs to the processor are deemed valuable. Therefore, it is advantageous to minimize the number of inputs required from a processor to detect key actuations.

Scanning methods have been commonly used for detecting key actuations and have somewhat reduced the number of inputs needed therefor. However, such methods typically employ a periodic toggling of an output of the processor, thereby undesirably introducing noise to electronic circuitry of the electronic device. Such noise can be particularly disadvantageous in an electronic device which performs radio frequency (RF) communications. In addition, scanning methods employ an algorithm for detection which is somewhat more complex than conventional detection methods. Therefore, it would be advantageous to employ a method which is simple and which does not require a periodically toggling of a processor's output.

Other conventional methods have reduced the number of inputs needed for detecting key actuations without generating the noise as described above. One such method is a matrix-type method, where each key toggles a unique row and column input to a processor. For example, if seven inputs of a processor are utilized, where four of the inputs are designated as row inputs and three of the inputs are designated as column inputs, twelve keys may be uniquely distinguished and detected (4×3=12). This method, however, has not fully maximized the number of keys which can be uniquely detected given a number of processor inputs.

Finally, it is advantageous for an electronic device to be able to distinguish and detect simultaneous key actuations in order to process them as necessary.

BRIEF DESCRIPTION OF THE DRAWINGS

FIG. 5 is a schematic diagram of electronic circuitry which operates the electronic device of FIG. 1.

FIG. 7 shows a method describing the operation of the keypad circuit of FIG. 6.

FIG. 8 shows a method describing the operation of the processor of FIG. 6.

FIG. 9 is a table showing a plurality of predetermined key patterns for the embodiment shown in FIG. 6.

FIG. 10 is a table showing a plurality of predetermined key patterns of an alternate embodiment.

FIG. 11 is a table showing a plurality of predetermined key patterns of another alternate embodiment.

DETAILED DESCRIPTION OF THE PREFERRED EMBODIMENTS

According to the present invention, an electronic device includes at least L keys and a processor having at least M inputs. Upon actuation, each of the at least L keys toggles a unique combination of N inputs of the at least M inputs, where each unique combination is taken from all possible combinations thereof. The at least M inputs are read by the processor and compared to a plurality of predetermined key patterns. Upon a match between the at least M inputs and one of the plurality of predetermined key patterns, a key actuation is detected and a predetermined function may be processed in response thereto. The processor may ignore simultaneous key actuations where combinations of inputs greater than N are toggled.

Figure 1:
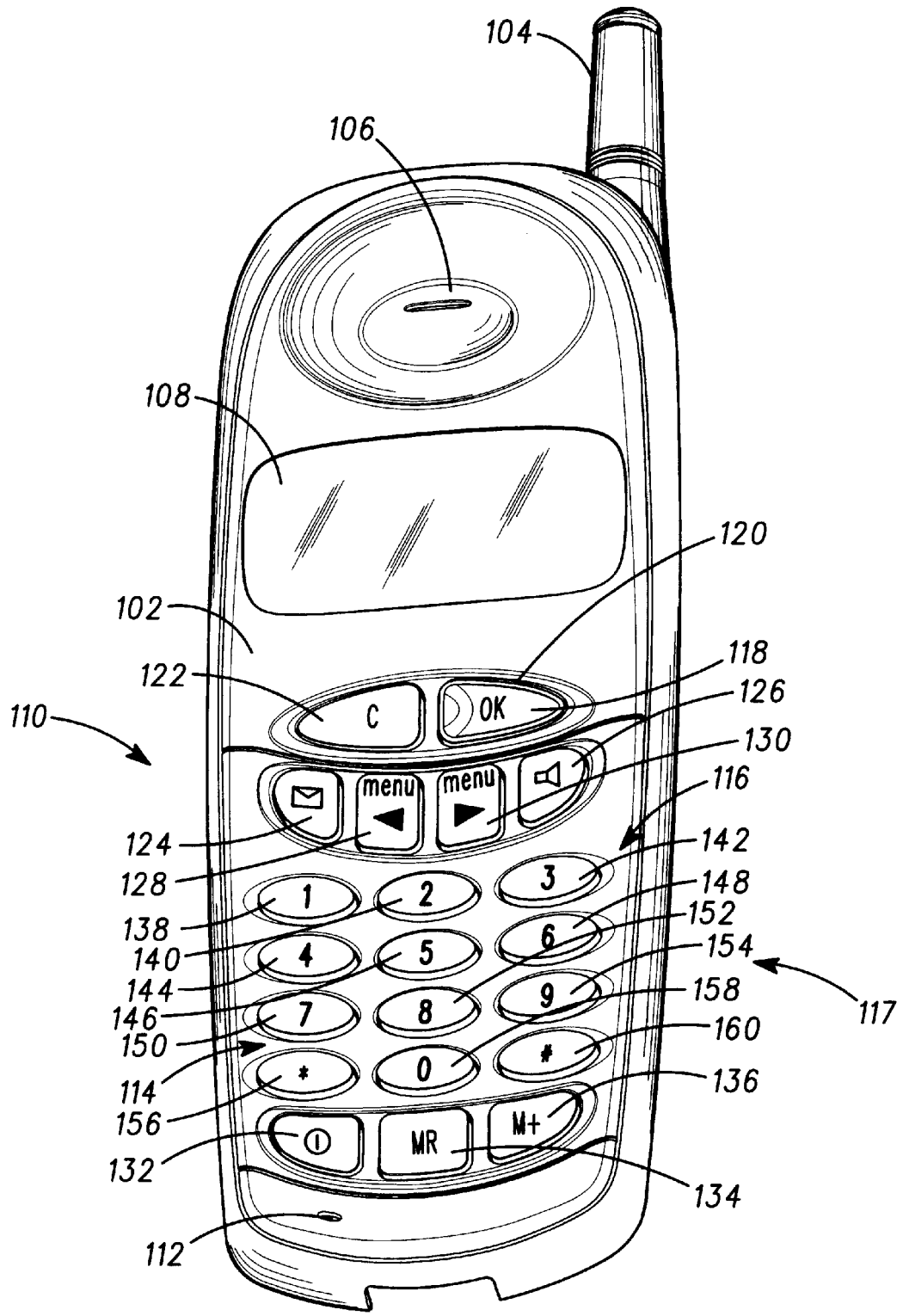
FIG. 1 is an illustration showing an electronic device which may embody the present invention.

FIG. 1 shows an electronic device 100 which may include the present invention. Electronic device 100 of FIG. 1 is a communication device and, more particularly, a radiotelephone used for telephone communications. Electronic device 100 of FIG. 1 may be more commonly referred to as a cellular telephone. Electronic device 100 comprises a housing 102, an antenna 104, a speaker 106, a display 108, a keypad 110, and a microphone 112. Keypad 110 is disposed within housing 102 and includes a plurality of keys 114.

Electronic device 100 includes electronic circuitry 500, shown in FIG. 5, disposed within housing 102. Electronic circuitry 500 is provided for processing functions within electronic device 100, functions primarily associated with telephone communications. Electronic circuitry 500 includes a receiver 502, a transmitter 504, a processor 506, and a keypad circuit 508. With receiver 502 and transmitter 504, electronic device 100 receives and transmits, respectively, radio frequency (RF) signals through antenna 104. Microphone 112 and speaker 106 (FIG. 1) are coupled to electronic circuitry 500 and are provided for talking and listening, respectively, during telephone communications. Processor 506 controls many functions of electronic device 100, including the operations of receiver 502 and transmitter 504. Processor 506 includes a memory 507 for storing data and instructions. Processor 506 also receives and processes signals from keypad circuit 508. The signals from keypad circuit 508 are generated in response to user inputs from keypad 110 (FIG. 1).

Referring back to FIG. 1, the plurality of keys 114 are used to control functions of electronic device 100 and to enter telephone numbers for placing telephone calls. More particularly, telephone numbers are entered using DTMF keys 117 which include a one key 138, a two key 140, a three key 142, a four key 144, a five key 146, a six key 148, a seven key 150, an eight key 152, a nine key 154, a zero key 158, an asterisk key 156, and a pound key 160. When one of DTMF keys 117 is depressed, a dual-tone multiple frequency (DTMF) audio signal may be heard from speaker 106. In addition, an alphanumeric character corresponding to the particular DTMF key pressed is displayed on display 108.

The plurality of keys 114 include a number of function keys, namely, an OK key 118, a C key 122, a voicemail key 124, a volume key 126, a left arrow key 128, a right arrow key 130, an on/off key 132, a memory recall key 134, and a memory store key 136. A user operates OK key 118 and C key 122 in response to questions which are displayed on display 108, where OK key 118 generally provides a "yes" response and C key 122 generally provides a "no" response. For example, display 108 may display "SEND CALL?" after a user has entered a telephone number using the plurality of DTMF keys 117 as described above. In response to this question, a user may press OK key 118 to connect the telephone call. Alternatively, the user may press C key 122 to clear the telephone number from display 108, thereby canceling the telephone call.

Each function key corresponds to a predetermined function for operating electronic device 100. Electronic device 100 may be turned on and off using on/off key 132. Voicemail key 124 may be used to access voicemail messages left for the user of electronic device 100. Left arrow key 128 and right arrow key 130 may be used to scroll though menus of features and options of electronic device 100. Volume key 126 may be used to raise and lower the volume of the audio from speaker 106. Memory store key 136 may be used to store a telephone number into memory 507 of electronic device 100, and memory recall key 134 may be used to recall a telephone number from memory 507. The plurality of keys 114 could include more commonly named cellular telephone keys, such as "SEND" and "END" keys, which have traditionally been provided for connecting and disconnecting telephone calls, respectively.

Figure 2:
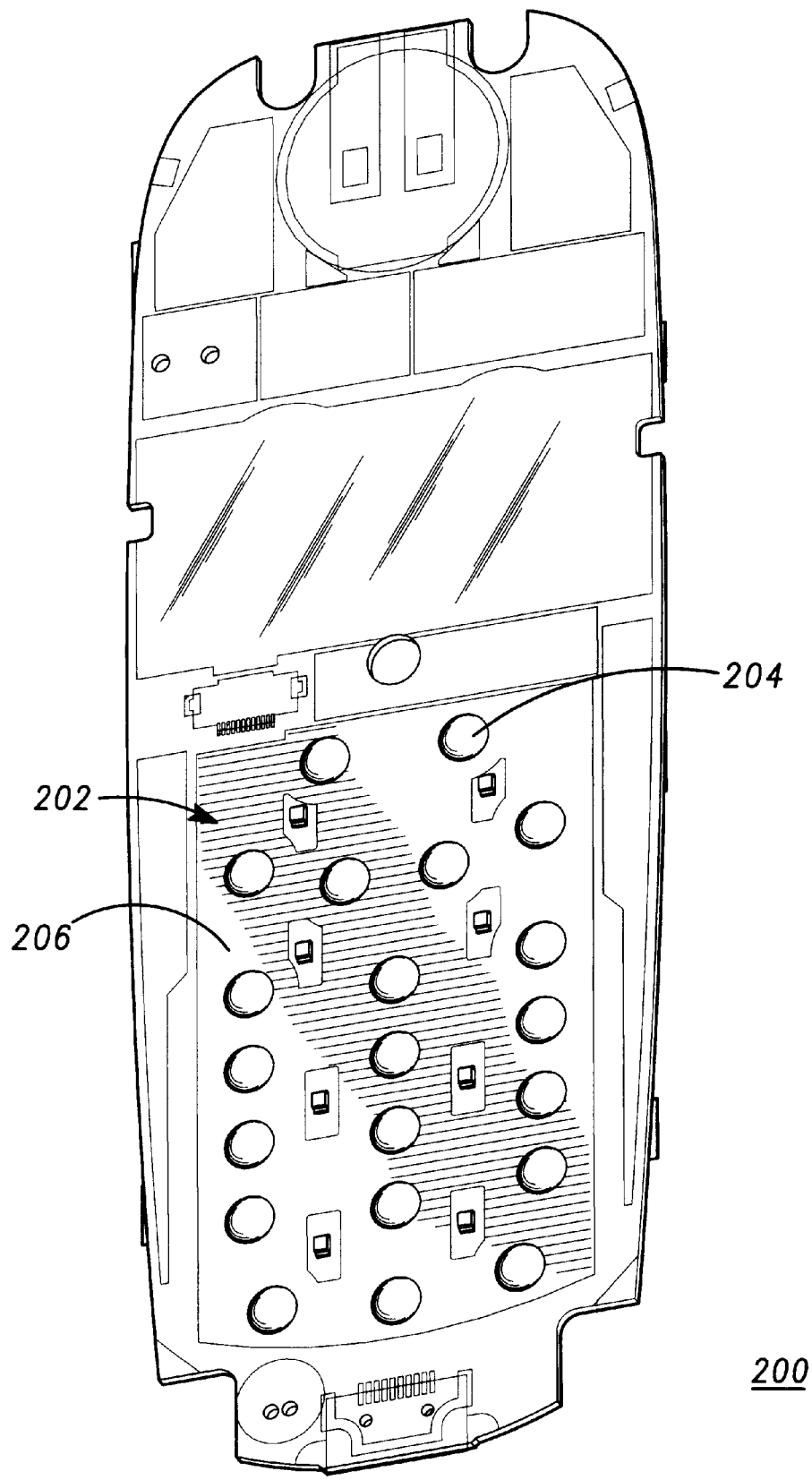
FIG. 2 is an illustration showing a printed circuit board (PCB) which is disposed within the electronic device of FIG. 1.

FIG. 2 shows a printed circuit board (PCB) 200 which is disposed within housing 102 when electronic device 100 is fully assembled. PCB 200 includes a plurality of contact regions 202, including a contact region 204. PCB 200 includes a contact sheet 206, preferably MYLAR™, adhesively attached to the surface of PCB 200.

Referring back to FIG. 1, keypad 110 is a rectangularly formed body which is typically manufactured from a flexible material, preferably rubber. The plurality of keys 114 are integrally molded from keypad 110. Housing 102 defines a plurality of holes 116, including a hole 120. Keypad 110 is sandwiched between housing 102 and PCB 200 (FIG. 2) when electronic device 100 is fully assembled, such that each one of the plurality of keys 114 inserts and slightly protrudes through one of the plurality of holes 116. Each one of the plurality of keys 114 corresponds to one of the plurality of contact regions 202 for making contact thereto. For example, OK key 118 is disposed through hole 120 and corresponds to contact region 204. When depressed by a user, a portion of OK key 118 makes physical contact with contact region 204.

Figure 3:
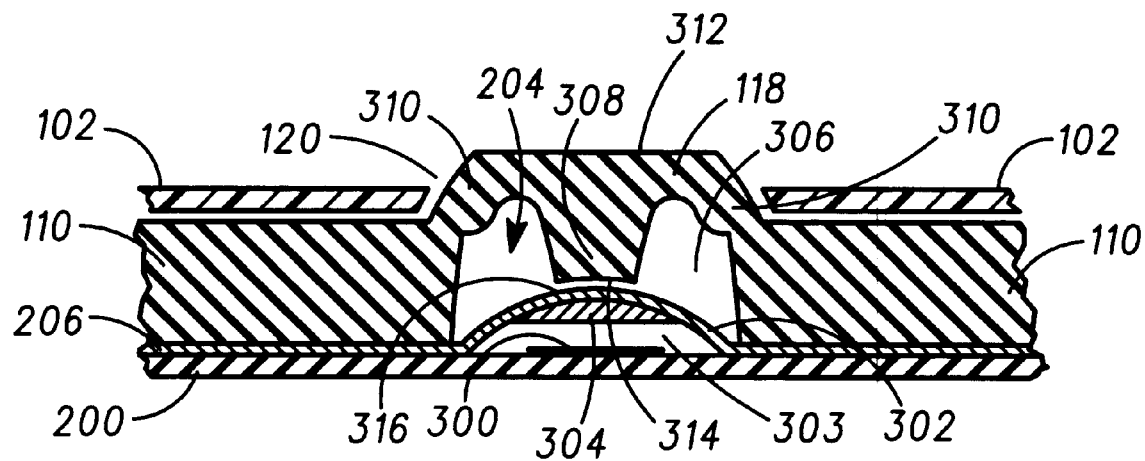
FIG. 3 is an illustration showing a cross-sectional side view of the electronic device of FIG. 1, the view including a portion of a keypad of the electronic device and a portion of the PCB of FIG. 2.

Providing more detail for such key actuations, FIG. 3 shows a cross-sectional side view of a portion of electronic device 100. This view includes a portion of PCB 200, a portion of contact sheet 206, and a portion of keypad 110 and OK key 118. Contact region 204 includes a conductive pad region 300 of PCB 200, a dome portion 302 defined from contact sheet 206, and a shorting pad 304 attached to the inside of dome portion 302. Contact sheet 206 and PCB 200 define a gap 303 formed from dome portion 302. Shorting pad 304 is made from an electrically conductive material, preferably silver. Keypad 110 integrally defines OK key 118 and a gap 306. OK key 118 includes a contact portion 308, a thinned portion 310, and a top portion 312. Top portion 312 slightly protrudes through hole 120.

When top portion 312 is pressed in a direction towards contact region 204, thinned portion 310 flexes easily to allow OK key 118 to move in a direction towards dome portion 302 and conductive pad region 300. A bottom surface 314 of contact portion 308 eventually makes contact with a top surface 316 of dome portion 302 when OK key 118 is further pressed. Since contact sheet 206 is made from a thin and flexible material, dome portion 302 bends inwardly such that shorting pad 304 makes physical and electrical contact with conductive pad region 300. When OK key 118 is released, shorting pad 304 loses contact with conductive pad region 300 and, thereafter, dome portion 302 and OK key 118 spring back into the position as shown in FIG. 3.

Figure 4:
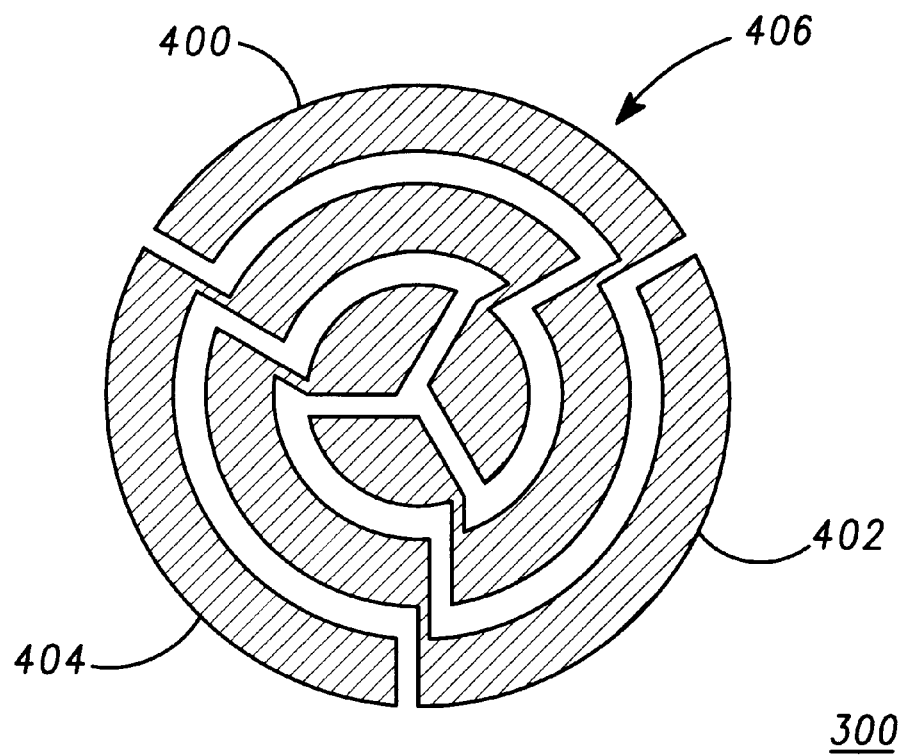
FIG. 4 is an illustration showing a conductive pad region of the PCB in accordance with the present invention.

FIG. 4 shows a top view of conductive pad region 300. Conductive pad region 300 includes a plurality of conductive pads 406 which are electrically conductive. In the embodiment of FIG. 4, the plurality of conductive pads 406 includes a conductive pad 400, a conductive pad 402, and a conductive pad 404. Although not shown in FIG. 4, each of the plurality of conductive pads 406 is coupled to other elements of keypad circuit 508, as described in detail below, via electrical traces or conductors of PCB 200. When shorting pad 304 makes physical contact with conductive pad region 300 from a depression of OK key 118, shorting pad 304 electrically couples conductive pads 400, 402, and 404 together. Shorting pad 304 has an area which is sized to cover a substantial portion of conductive pad region 300. Conductive pads 400, 402, and 404 are interdigitated for maximizing the likelihood that shorting pad 304 electrically couples conductive pads 400, 402, and 404 together when OK key 118 is depressed.

Each of the plurality of keys 114 of FIG. 1 and each of the plurality of contact regions 202 of FIG. 2 have a construction similar to that of OK key 118 and contact region 204, respectively, as described and shown in FIG. 3. In addition, each of the plurality of contact regions 202 includes a plurality of conductive pads similarly shaped and arranged as the plurality of conductive pads 406 of FIG. 4. Of course, any apparatus providing contact in response to key actuations may be used. For example, a conventional apparatus may be used where contact sheet 206 is excluded from the design and shorting pad 304 is attached directly to bottom surface 314 of OK key 118.

Figure 6:
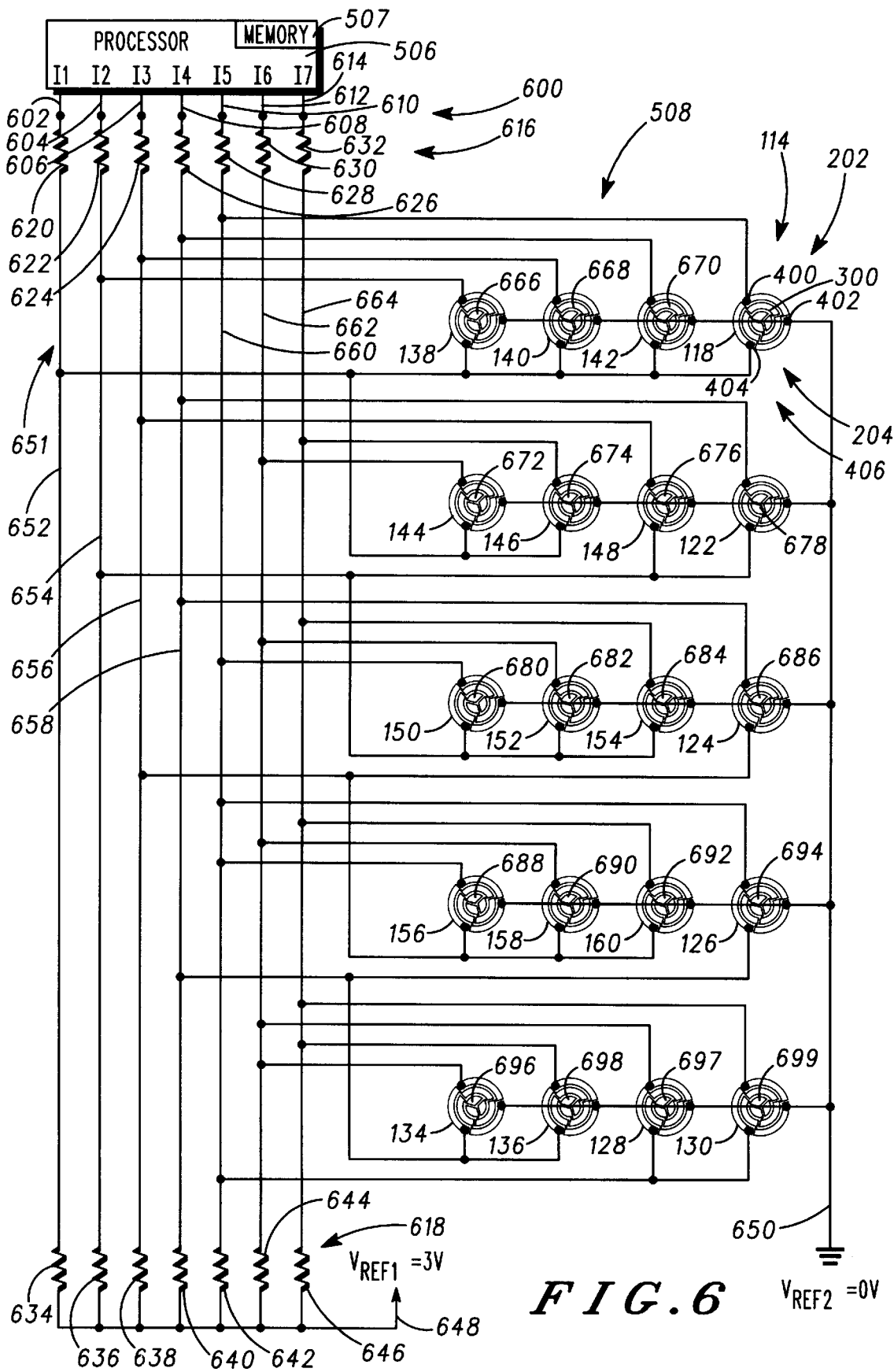
FIG. 6 is a schematic diagram showing a keypad circuit and a processor in accordance with the present invention.

FIG. 6 is a schematic diagram showing keypad circuit 508 and processor 506 in accordance with the present invention. (On/off key 132 is not shown in FIG. 6 since it is not detected in the manner described herein.) Processor 506 has a plurality of inputs 600. The plurality of inputs 600 includes an input 602, an input 604, an input 606, an input 608, an input 610, an input 612, and an input 614. In FIG. 6, inputs 602, 604, 606, 608, 610, 612, and 614 are designated I1, I2, I3, I4, I5, I6, and I7, respectively. In this embodiment, each of the plurality of inputs 600 are digital logic inputs, that is, only one of two voltage-based states, '0' or '1', is recognizable by processor 506. Processor 506 includes a software program which periodically reads and processes the plurality of inputs 600 as will be described in more detail below.

Keypad circuit 508 includes a plurality of resistors 616 and a plurality of resistors 618. The plurality of resistors 616 includes a resistor 620, a resistor 622, a resistor 624, a resistor 626, a resistor 628, a resistor 630, and a resistor 632. The plurality of resistors 618 includes a resistor 634, a resistor 636, a resistor 638, a resistor 640, a resistor 642, a resistor 644, and a resistor 646. The pluralities of resistors 616 and 618 are coupled to a plurality of nodes 651. Resistors 620, 622, 624, 626, 628, 630, and 632 each have first ends coupled to inputs 602, 604, 606, 608, 610, 612, and 614, respectively, and have second ends coupled to resistors 634, 636, 638, 640, 642, 644, and 646 at nodes 652, 654, 656, 658, 660, 662, and 664, respectively. Each of resistors 634, 636, 638, 640, 642, 644, and 646 have second ends coupled to a reference voltage 648.

OK key 118 corresponds to the plurality of conductive pads 406, where conductive pad 402 is coupled to a reference voltage 650, conductive pad 404 is coupled to node 652, and conductive pad 400 is coupled to node 660. In the preferred embodiment, reference voltage 648 is about 3-volts and reference voltage 650 is about 0-volts. Here, therefore, when OK key 118 is not pressed, inputs 602 and 610 are biased at 3-volts (processor 506 reading '1' for both inputs 602 and 610); when OK key 118 is pressed, conductive pads 400 and 404 are shorted to conductive pad 402 and thereby electrically coupled to reference voltage 650, or 0-volts. In this case, inputs 602 and 610 are biased at 0-volts (processor 506 reading '0' for both inputs 602 and 610).

Each of the plurality of keys 114 shown in FIG. 6 has a corresponding arrangement similar to OK key 118 described above. For clarity, a description of each arrangement shown in FIG. 6 follows. One key 138 corresponds to a plurality of conductive pads 666 which includes a first conductive pad coupled to reference voltage 650, a second conductive pad coupled to node 652, and a third conductive pad coupled to node 654. Two key 140 corresponds to a plurality of conductive pads 668 which includes a first conductive pad coupled to reference voltage 650, a second conductive pad coupled to node 652, and a third conductive pad coupled to node 656. Three key 142 corresponds to a plurality of conductive pads 670 which includes a first conductive pad coupled to reference voltage 650, a second conductive pad coupled to node 652, and a third conductive pad coupled to node 658. Four key 144 corresponds to a plurality of conductive pads 672 which includes a first conductive pad coupled to reference voltage 650, a second conductive pad coupled to node 652, and a third conductive pad coupled to node 662. Five key 146 corresponds to a plurality of conductive pads 674 which includes a first conductive pad coupled to reference voltage 650, a second conductive pad coupled to node 652, and a third conductive pad coupled to node 664. Six key 148 corresponds to a plurality of conductive pads 676 which includes a first conductive pad coupled to reference voltage 650, a second conductive pad coupled to node 654, and a third conductive pad coupled to node 656. C key 122 corresponds to a plurality of conductive pads 678 which includes a first conductive pad coupled to reference voltage 650, a second conductive pad coupled to node 654, and a third conductive pad coupled to node 658. Seven key 150 corresponds to a plurality of conductive pads 680 which includes a first conductive pad coupled to reference voltage 650, a second conductive pad coupled to node 654, and a third conductive pad coupled to node 660. Eight key 152 corresponds to a plurality of conductive pads 682 which includes a first conductive pad coupled to reference voltage 650, a second conductive pad coupled to node 654, and a third conductive pad coupled to node 662. Nine key 154 corresponds to a plurality of conductive pads 684 which includes a first conductive pad coupled to reference voltage 650, a second conductive pad coupled to node 654, and a third conductive pad coupled to node 664. Voicemail key 124 corresponds to a plurality of conductive pads 686 which includes a first conductive pad coupled to reference voltage 650, a second conductive pad coupled to node 656, and a third conductive pad coupled to node 658. Asterisk key 156 corresponds to a plurality of conductive pads 688 which includes a first conductive pad coupled to reference voltage 650, a second conductive pad coupled to node 656, and a third conductive pad coupled to node 660. Zero key 158 corresponds to a plurality of conductive pads 690 which includes a first conductive pad coupled to reference voltage 650, a second conductive pad coupled to node 656, and a third conductive pad coupled to node 662. Pound key 160 corresponds to a plurality of conductive pads 692 which includes a first conductive pad coupled to reference voltage 650, a second conductive pad coupled to node 656, and a third conductive pad coupled to node 664. Volume key 126 corresponds to a plurality of conductive pads 694 which includes a first conductive pad coupled to reference voltage 650, a second conductive pad coupled to node 658, and a third conductive pad coupled to node 660. Memory recall key 134 corresponds to a plurality of conductive pads 696 which includes a first conductive pad coupled to reference voltage 650, a second conductive pad coupled to node 658, and a third conductive pad coupled to node 662. Memory store key 136 corresponds to a plurality of conductive pads 698 which includes a first conductive pad coupled to reference voltage 650, a second conductive pad coupled to node 658, and a third conductive pad coupled to node 664. Left arrow key 128 corresponds to a plurality of conductive pads 697 which includes a first conductive pad coupled to reference voltage 650, a second conductive pad coupled to node 660, and a third conductive pad coupled to node 662. Right arrow key 130 corresponds to a plurality of conductive pads 699 which includes a first conductive pad coupled to reference voltage 650, a second conductive pad coupled to node 660, and a third conductive pad coupled to node 664.

FIG. 7 shows a method which describes the operation of keypad circuit 508 of FIG. 6. A block 700 shows a starting position. At step 702, an actuation of one of the plurality of keys 114 is awaited. Here, since none of the plurality of keys 114 is actuated, each of the plurality of inputs 600 is biased at reference voltage 648. Processor 506 therefore reads '1111111'. When one of the plurality of keys 114 is pressed, step 704 occurs. Here, a unique combination of two inputs of the plurality of inputs 600 is toggled. For example, when OK key 118 is depressed, inputs 602 and 610 are toggled from reference voltage 648 to reference voltage 650. Here, processor 506 reads '0111011'. As can be recognized from FIG. 6 and the above description thereof, each key of the plurality of keys 114 toggles a unique combination of two inputs of the plurality of inputs 600 upon actuation. In the embodiment shown and described, such toggling occurs from a high voltage state (3-volts=bit '1') to a low voltage state (0-volts=bit '0').

FIG. 8 shows a method which describes the operation of processor 506 of the embodiment shown in FIG. 6. A block 800 shows a starting position. Processor 506 reads the plurality of inputs 600 at step 802. Here, where none of the plurality of keys 114 is actuated, processor 506 reads '1111111'. Alternatively, where one of the plurality of keys 114 is actuated, for example, OK key 118, processor 506 reads '0111011'. At step 804, processor 506 compares the plurality of inputs 600 to a plurality of predetermined key patterns 806. The plurality of predetermined key patterns 806 for this embodiment is shown in the table of FIG. 9. Data corresponding to the table of FIG. 9 are stored in memory 507 of processor 506 (FIG. 6). At step 808, if there is a match between the plurality of inputs 600 and one of the plurality of predetermined key patterns 806, a corresponding key actuation is detected at step 810. At step 812, processor 506 may process a predetermined function corresponding to the particular key that was actuated. Thereafter, the process is repeated at step 802 where processor 506 reads the plurality of inputs 600 again. At step 802, if there is no match between the plurality of inputs 600 and the plurality of predetermined key patterns 806, the process is likewise repeated at step 802.

Suppose, for example, a user actuates volume key 126. In response to this actuation, inputs 608 and 610 are toggled from high to low (step 704 of FIG. 7). Next, processor 506 reads '1110011' from the plurality of inputs 600 (step 802 of FIG. 8). Processor 506 compares '1110011'to each of the plurality of predetermined key patterns of FIG. 9 (step 804). From this comparison, a match occurs between '1110011' and one of the predetermined key patterns when tested (step 808). In particular, the predetermined key pattern which matches is shown in row seventeen of FIG. 9. The predetermined key pattern which matches the plurality of inputs 600 corresponds to volume key 126. Thus, processor 506 detects that volume key 126 is actuated (step 810). In response to this actuation, processor 506 may process a predetermined function which increases the volume of the audio from speaker 106 (step 812). In brief, a signal is generated upon actuation of volume key 126, this signal is detected at inputs 608 and 610 by processor 506, and, in response thereto, a predetermined function is processed by processor 506.

Suppose, however, that a user presses volume key 126 and OK key 118 simultaneously. Inputs 602, 608, and 610 are toggled from high to low. Therefore, processor 506 reads '0110011' from the plurality of inputs 600 (step 802). Processor 506 compares '0110011' to each of the plurality of predetermined key patterns of FIG. 9 (step 804). From this comparison, none of the plurality of predetermined key patterns of FIG. 9 matches '0110011' when tested (step 808). Processor 506, in effect, detects no key actuation, and continues reading the plurality of inputs 600 (step 802). Using such a method, simultaneous key actuations may desirably be ignored. Alternatively, predetermined functions may be processed in response to simultaneous key actuations if such patterns are included in the plurality of predetermined key patterns 806. Such predetermined functions may include null functions ("do nothing" functions) which would effectively ignore simultaneous key actuations.

Of course, processor 506 may read and process key actuations in many different ways. Processor 506 may provide "switch debouncing" by reading and comparing the plurality of inputs 600 a number of times before making any decisions. Switch debouncing may be necessary because voltages of the plurality of inputs 600 may be unstable when keys are actuated. In addition, processor 506 may read the plurality of inputs 600 periodically, or perhaps in response to a change in voltage to one or more of the plurality of inputs 600. Processor 506 may process a predetermined function at a time when a key is pressed, released, or pressed and held for an extended period of time. Regarding keypad circuit 508, the present invention is not limited to, for example, toggling the plurality of inputs 600. For example, a key actuation may provide a quick pulse to a unique combination of the plurality of inputs 600, where processor 506 reads and processes the quick pulses accordingly.

It can be recognized that twenty-one different keys can be detected by utilizing seven inputs of processor 506 in accordance with the present invention. It is noted, however, that all of the possible combinations of two inputs are not used in the embodiment shown in FIG. 6. In particular, a key which sets the plurality of inputs 600 to '1111100' upon actuation is not, but could be, used. Thus, the embodiment is shown in FIG. 6 as providing only twenty keys.

The embodiment shown in FIGS. 6, 7, 8, and 9 and described herein can be more generally stated. If a processor has at least M inputs used for key detection and, upon key actuations, unique combinations of N inputs of the at least M inputs are toggled, then the number of keys that an electronic device may uniquely distinguish and detect is equivalent to $$M!/[N!(M-N)!].$$

An electronic device, therefore, may include at least L keys, where L=M!/[N!(M-N)!]. The unique combinations of N inputs that are toggled are taken from all possible combinations of N inputs of the at least M inputs. Each contact region or conductive pad region includes N+1 conductive pads, where one of the N+1 conductive pads is coupled to a reference voltage and each of the N conductive pads of the N+1 conductive pads is coupled to one of the at least M nodes or inputs. It is noted that a large number of keys relative to the number of processor inputs required is realized particularly when N>4, and more particularly when N>4 and M−N>1.

N may be numerically limited to any limitations of an electronic device embodying the present invention, or limited to any limitations of an apparatus utilized to provide signals to a processor in response to key actuations. For example, consider the embodiment shown in FIGS. 1, 2, 3, and 4 and described herein. Electronic device 100 is manufactured small enough to fit into a user's hand. Accordingly, PCB 200 is small, and the number of keys required of electronic device 100 is relatively large. Therefore, each of the plurality of keys 114 and contact regions 202 are small, limiting the number of conductive pads possible per conductive pad region. Thus, N is numerically limited by the difficulty and cost of providing many conductive pads and electrical traces on PCB 200. In the preferred embodiment, N is chosen as two and the number of conductive pads needed per conductive pad region is therefore only three (N+1=2+1=3).

FIG. 10 shows a table listing a plurality of predetermined key patterns of an alternate embodiment. Here, each key actuation toggles a unique combination of two of five inputs of a processor. Therefore, ten keys (keys B through K) may be realized (5!/2!(5−2)!=10). This alternate embodiment is not, however, strictly limited to ten keys. For example, additional keys L through N listed in FIG. 10 may be added, where each of additional keys L through N toggles a unique combination of three of the five inputs. Each corresponding conductive pad region for additional keys L through N would therefore include four conductive pads (N+1=3+1=4). Since processor 506 can distinguish between such unique togglings using a corresponding plurality of predetermined key patterns, all such single key actuations can be uniquely distinguished and detected. The number of keys which may be realized from such an embodiment is twenty (5!/2!(5−2)!+5!/3!(5−3)!=10+10=20).

As another example, additional keys O through Q as listed in FIG. 10 can be added, where each of additional keys O through N toggles a single unique input of the five inputs. Each corresponding conductive pad region for additional keys O through Q would include only two conductive pads (N+1=1+1=2). Here, five additional keys may be added (5!/1!(5−1)!=5).

FIG. 11 shows another alternate embodiment where M=7 and N=3. In this embodiment, thirty-five keys may be realized using only seven inputs to a processor (7!/3!(7−4)!=35). As described above in the Background of the Invention, the matrix-type method is capable of distinguishing and detecting a maximum of twelve keys using seven inputs to a processor. Thus, in this case, the non-matrix method in accordance with the present invention can detect twenty-three more keys than the matrix-type method (35−12=23). Several additional keys can be detected since the present invention utilizes all possible combinations of N inputs of the at least M inputs, not just matrix-type combinations (e.g. row/column) of the prior art. Matrix-type combinations, where each input of a plurality of row inputs is combined only with one input of a plurality of column inputs, have provided only limited combinations and therefore a limited set of corresponding keys.

Although various embodiments are possible as described above, the preferred embodiment includes keys which toggle only a unique combination of N inputs. That is, no mixture of combinations is utilized in the same keypad detection scheme. This method is preferred since simultaneous key actuations can be recognized by processor 506 and accordingly ignored, or at least handled somewhat differently. In a keypad detection scheme according to FIG. 10, a depression of key B cannot be uniquely distinguished from simultaneous depressions of keys O and P. In contrast, in a preferred keypad detection scheme according to FIGS. 6 and 9, any simultaneous depression of keys is recognizable. For example, when left arrow key 128 and right arrow key 130 are simultaneously depressed, '1111000' is read by processor 506. Since '1111000' is not a toggling of a unique combination of N inputs, where N=2, it is not included in the plurality of predetermined key patterns 806 of FIG. 9. Thus, simultaneous depressions are ignored by processor 506.

While particular embodiments of the present invention have been shown and described, modifications may be made. It is therefore intended in the appended claims to cover all such changes and modifications which fall within the true spirit and scope of the invention.

What is claimed is:

1. A method of detecting key actuations in an electronic device, the electronic device including a processor, the method comprising the steps of:

generating a first signal in response to an actuation of a first key of the electronic device;

detecting the first signal at a first input and a second input of the processor;

performing a first predetermined function in response to the step of detecting the first signal at the first input and the second input;

generating a second signal in response to an actuation of a second key of the electronic device;

detecting the second signal at the first input and a third input of the processor;

performing a second predetermined function in response to the step of detecting the second signal at the first input and the third input;

generating a third signal in response to an actuation of a third key, of the electronic device;

detecting the third signal at the second input and the third input of the processor;

performing a third predetermined function in response to the step of detecting the third signal at the second input and the third input;

simultaneously detecting the first signal and the second signal:

performing a null function in response to said step of simultaneous detecting the first signal and the second signal;

simultaneously detecting the first signal and the third signal;

performing the null function in response to said step of simultaneous detecting the first signal and the third signal:

simultaneously detecting the second signal and the third signal; and performing the null function in response to said step of simultaneous detecting the second signal and the third signal.

2. The method according to claim 1, further comprising the steps of:

generating a fourth signal in response to an actuation of a fourth key of the electronic device;

detecting the fourth signal at the first input and a fourth input of the processor;

performing a fourth predetermined function in response to the step of detecting the fourth signal at the first input and the fourth input;

generating a fifth signal in response to an actuation of a fifth key of the electronic device;

detecting the fifth signal at the second input and the fourth input of the processor;

performing a fifth predetermined function in response to the step of detecting the fifth signal at the second input and the fourth input;

generating a sixth signal in response to an actuation of a sixth key of the electronic device;

detecting the sixth signal at the third input and the fourth input of the processor;

performing a sixth predetermined function in response to the step of detecting the sixth signal at the third input and the fourth input;

simultaneously detecting the fourth signal and the fifth signal;

performing a null function in response to said step of simultaneous detecting the fourth signal and the fifth signal;

simultaneously detecting the fourth signal and the sixth signal;

performing the null function in response to said step of simultaneous detecting the fourth signal and the sixth signal;

simultaneously detecting the fifth signal and the sixth signal; and performing the null function in response to said step of simultaneous detecting the fifth signal and the sixth signal.

3. A portable electronic device, comprising:

at least L keys, said at least L keys including a first key, a second key, a third key, a fourth key, a fifth key, and a sixth key;

a keypad circuit, said keypad circuit disposed adjacent to said at least L keys, said keypad circuit including at least M nodes biased at a first voltage, said at least M nodes including a first node, a second node, a third node, and a fourth node, said keypad circuit to toggle the first voltage to a second voltage for a unique combination of N nodes of said at least M nodes for each key actuation of said at least L keys, including toggling at said first and said second nodes in response to an actuation of said first key, toggling at said first and said third nodes in response to an actuation of said second key, toggling at said first and said fourth nodes in response to an actuation of said third key, toggling at said second and said third nodes in response to an actuation of said fourth key, toggling at said second and said fourth nodes in response to an actuation of said fifth key, and toggling at said third and said fourth nodes in response to an actuation of said sixth key; and a processor, said processor having at least M inputs, each input of said at least M inputs coupled to one node of said at least M nodes, said processor to read said at least M inputs, compare said at least M inputs with a plurality of predetermined key patterns, and perform a predetermined function in response to a match between said at least M inputs and one pattern of said plurality of predetermined key patterns.

4. The portable electronic device according to claim 3, wherein $$N>2, M-N>1, \text{ and } L=M!/[N!(M-N)!].$$

5. An electronic device, comprising:
a plurality of keys, said plurality of keys including at least a first key, a second key, and a third key;
a circuit board, said circuit board including a plurality of contact regions, said plurality of contact regions including:
   a first contact region, said first contact region including a first conductive pad, a second conductive pad, and a third conductive pad, said third conductive pad coupled to a first voltage;
   a second contact region, said second contact region including a fourth conductive pad, a fifth conductive pad, and a sixth conductive pad, said sixth conductive pad coupled to the first voltage;
   a third contact region, said third contact region including a seventh conductive pad, an eighth conductive pad, and a ninth conductive pad, said ninth conductive pad coupled to the first voltage;
a plurality of shorting pads, said plurality of shorting pads including a first shorting pad located between said first key and said first contact region, a second shorting pad located between said second key and said second contact region, and a third shorting pad located between said third key and said third contact region; and
a processor, said processor including a first input, a second input, and a third input, said first through said third inputs coupled to a second voltage different from the first voltage, said first input coupled to said first conductive pad and said second input coupled to said second conductive pad for said processor to detect an actuation of said first key, said first input coupled to said fourth conductive pad and said third input coupled to said fifth conductive pad for said processor to detect an actuation of said second key, and said second input coupled to said seventh conductive pad and said third input coupled to said eighth conductive pad for said processor to detect an actuation of said third key.

6. The electronic device according to claim 5, wherein said electronic device comprises a portable radio communication device.

7. The electronic device according to claim 5, further comprising:
said plurality of keys including a fourth key, a fifth key, and a sixth key;
said plurality of contact regions including:
   a fourth contact region, said fourth contact region including a tenth conductive pad, an eleventh conductive pad, and a twelfth conductive pad, said twelfth conductive pad coupled to the first voltage;
   a fifth contact region, said fifth contact region including a thirteenth conductive pad, a fourteenth conductive pad, and a fifteenth conductive pad, said fifteenth conductive pad coupled to the first voltage;
   a sixth contact region, said sixth contact region including a sixteenth conductive pad, a seventeenth conductive pad, and a eighteenth conductive pad, said eighteenth conductive pad coupled to the first voltage;
said plurality of shorting pads including a fourth shorting pad located between said fourth key and said fourth contact region, a fifth shorting pad located between said fifth key and said fifth contact region, and a sixth shorting pad located between said sixth key and said sixth contact region; and
said processor including a fourth input, said first input coupled to said tenth conductive pad and said fourth input coupled to said eleventh conductive pad for said processor to detect an actuation of said fourth key, said second input coupled to said thirteenth conductive pad and said fourth input coupled to said fourteenth conductive pad for said processor to detect an actuation of said fifth key, and said third input coupled to said sixteenth conductive pad and said fourth input coupled to said seventeenth conductive pad for said processor to detect an actuation of said sixth key.

8. The electronic device according to claim 7, further comprising:
said plurality of keys including a seventh key, an eighth key, a ninth key, and a tenth key;
said plurality of contact regions including:
   a seventh contact region, said seventh contact region including a nineteenth conductive pad, a twentieth conductive pad, and a twenty-first conductive pad, said twenty-first conductive pad coupled to the first voltage;
   an eighth contact region, said eighth contact region including a twenty-second conductive pad, a twenty-third conductive pad, and a twenty-fourth conductive pad, said twenty-fourth conductive pad coupled to the first voltage;
   a ninth contact region, said ninth contact region including a twenty-fifth conductive pad, a twenty-sixth conductive pad, and a twenty-seventh conductive pad, said twenty-seventh conductive pad coupled to the first voltage;
   a tenth contact region, said tenth contact region including a twenty-eighth conductive pad, a twenty-ninth conductive pad, and a thirtieth conductive pad, said thirtieth conductive pad coupled to the first voltage;
said plurality of shorting pads including a seventh shorting pad located between said seventh key and said seventh contact region, an eighth shorting pad located between said eighth key and said eighth contact region, a ninth shorting pad located between said ninth key and said ninth contact region, and a tenth shorting pad located between said tenth key and said tenth contact region;
and said processor including a fifth input, said first input coupled to said nineteenth conductive pad and said fifth input coupled to said twentieth conductive pad for said processor to detect an actuation of said seventh key, said second input coupled to said twenty-second conductive pad and said fifth input coupled to said twenty-third conductive pad for said processor to detect an actuation of said eighth key, said third input coupled to said twenty-fifth conductive pad and said fifth input coupled to said twenty-sixth conductive pad for said processor to detect an actuation of said ninth key, and said fourth input coupled to said twenty-eighth conductive pad and said fifth input coupled to said twenty-ninth conductive pad for said processor to detect an actuation of said tenth key.

9. The electronic device according to claim 7, wherein said electronic device comprises a portable radio communication device.

10. An electronic device, comprising:
- a plurality of keys, said plurality of keys including at least a first key, a second key, a third key, a fourth key, a fifth key, a sixth key, a seventh key, an eighth key, a ninth key, and a tenth key;
- a circuit board, said circuit board including a plurality of contact regions, said plurality of contact regions including:
  - a first contact region, said first contact region including a first conductive pad, a second conductive pad, a third conductive pad, and a fourth conductive pad, said fourth conductive pad coupled to a first voltage;
  - a second contact region, said second contact region including a fifth conductive pad, a sixth conductive pad, a seventh conductive pad, and an eighth conductive pad, said eighth conductive pad coupled to the first voltage;
  - a third contact region, said third contact region including a ninth conductive pad, a tenth conductive pad, an eleventh conductive pad, and a twelfth conductive pad, said twelfth conductive pad coupled to the first voltage;
  - a fourth contact region, said fourth contact region including a thirteenth conductive pad, a fourteenth conductive pad, a fifteenth conductive pad, and a sixteenth conductive pad, said sixteenth conductive pad coupled to the first voltage;
  - a fifth contact region, said fifth contact region including a seventeenth conductive pad, an eighteenth conductive pad, a nineteenth conductive pad, and a twentieth conductive pad, said twentieth conductive pad coupled to the first voltage;
  - a sixth contact region, said sixth contact region including a twenty-first conductive pad, a twenty-second conductive pad, a twenty-third conductive pad, and a twenty-fourth conductive pad, said twenty-fourth conductive pad coupled to the first voltage;
  - a seventh contact region, said seventh contact region including a twenty-fifth conductive pad, a twenty-sixth conductive pad, a twenty-seventh conductive pad, and a twenty-eighth conductive pad, said twenty-eighth conductive pad coupled to the first voltage;
  - an eighth contact region, said eighth contact region including a twenty-ninth conductive pad, a thirtieth conductive pad, a thirty-first conductive pad, and a thirty-second conductive pad, said thirty-second conductive pad coupled to the first voltage;
  - a ninth contact region, said ninth contact region including a thirty-third conductive pad, a thirty-fourth conductive pad, a thirty-fifth conductive pad, and a thirty-sixth conductive pad, said thirty-sixth conductive pad coupled to the first voltage;
  - a tenth contact region, said tenth contact region including a thirty-seventh conductive pad, a thirty-eighth conductive pad, a thirty-ninth conductive pad, and a fortieth conductive pad, said fortieth conductive pad coupled to the first voltage;
- a plurality of shorting pads, said plurality of shorting pads including a first shorting pad located between said first key and said first contact region, a second shorting pad located between said second key and said second contact region, and a third shorting pad located between said third key and said third contact region, a fourth shorting pad located between said fourth key and said fourth contact region, a fifth shorting pad located between said fifth key and said fifth contact region, a sixth shorting pad located between said sixth key and said sixth contact region, a seventh shorting pad located between said seventh key and said seventh contact region, an eighth shorting pad located between said eighth key and said eighth contact region, a ninth shorting pad located between said ninth key and said ninth contact region, and a tenth shorting pad located between said tenth key and said tenth contact region;
- a processor, said processor including a first input, a second input, a third input, a fourth input, and a fifth input, said first through said fifth inputs coupled to a second voltage different from the first voltage, wherein
  - said first input is coupled to said first conductive pad, said second input is coupled to said second conductive pad, and said third input is coupled to said third conductive pad for said processor to detect an actuation of said first key;
  - said first input is coupled to said fifth conductive pad, said second input is coupled to said sixth conductive pad, and said fourth input is coupled to said seventh conductive pad for said processor to detect an actuation of said second key;
  - said first input is coupled to said ninth conductive pad, said second input is coupled to said tenth conductive pad, and said fifth input is coupled to said eleventh conductive pad for said processor to detect an actuation of said third key;
  - said first input is coupled to said thirteenth conductive pad, said third input is coupled to said fourteenth conductive pad, and said fourth input is coupled to said fifteenth conductive pad for said processor to detect an actuation of said fourth key;
  - said first input is coupled to said seventeenth conductive pad, said third input is coupled to said eighteenth conductive pad, and said fifth input is coupled to said nineteenth conductive pad for said processor to detect an actuation of said fifth key;
  - said first input is coupled to said twenty-first conductive pad, said fourth input is coupled to said twenty-second conductive pad, and said fifth input is coupled to said twenty-third conductive pad for said processor to detect an actuation of said sixth key;
  - said second input is coupled to said twenty-fifth conductive pad, said third input is coupled to said twenty-sixth conductive pad, and said fourth input is coupled to said twenty-seventh conductive pad for said processor to detect an actuation of said seventh key;
  - said second input is coupled to said twenty-ninth conductive pad, said third input is coupled to said thirtieth conductive pad, and said fifth input is coupled to said thirty-first conductive pad for said processor to detect an actuation of said eighth key;
  - said second input is coupled to said thirty-third conductive pad, said fourth input is coupled to said thirty-fourth conductive pad, and said fifth input is coupled to said thirty-fifth conductive pad for said processor to detect an actuation of said ninth key; and said third input is coupled to said thirty-seventh conductive pad, said fourth input is coupled to said thirtieth-eighth conductive pad, and said fifth input is coupled to said thirty-ninth conductive pad for said processor to detect an actuation of said tenth key.

11. The electronic device according to claim 10, wherein said electronic device comprises a portable radio communication device.

* * * * *